United States Patent [19]

Hoch et al.

[11] 3,911,031
[45] Oct. 7, 1975

[54] PRODUCTION OF 3-NITRO-P-CRESOL-(1)

[75] Inventors: Helmut Hoch; Hans-Juergen Quadbeck-Seeger, both of Ludwigshafen, Germany

[73] Assignee: Badische Anilin- & Soda-Fabrik Aktiengesellschaft, Ludwigshafen (Rhine), Germany

[22] Filed: Mar. 15, 1973

[21] Appl. No.: 341,348

[30] Foreign Application Priority Data
Mar. 21, 1972   Germany............................ 2213568
Dec. 22, 1972   Germany............................ 2262853
Dec. 22, 1972   Germany............................ 2262854

[52] U.S. Cl................................ 260/622; 260/463
[51] Int. Cl.[2]......................................... C07C 79/24
[58] Field of Search.... 260/622 R, 622, 463, 621 R, 260/632 R, 639 R

[56] References Cited
FOREIGN PATENTS OR APPLICATIONS
206,638   2/1909   Germany........................ 260/622 R

OTHER PUBLICATIONS

Copisarow, "J. Chem. Soc.," pp. 251–253, (1939).

Lucas et al., "J. Amer. Chem. Soc.," Vol. 55 pp. 1271–1280, (1933).

*Primary Examiner*—Bernard Helfin
*Assistant Examiner*—W. B. Lone
*Attorney, Agent, or Firm*—Johnston, Keil, Thompson & Shurtleff

[57] ABSTRACT

3-nitro-p-cresol-(1) is produced by nitration of p-cresol carbonate, precipitation of 3-nitro-p-cresol carbonate by dilution with water at 85° to 100°C and saponification of the carbonate in aqueous ammonia at 60° to 80°C or in the presence of amines at a temperature of not more than 80°C. The product is a starting material for the production of dyes and herbicides.

14 Claims, No Drawings

PRODUCTION OF 3-NITRO-P-CRESOL-(1)

The invention relates to a process for the production of 3-nitro-p-cresol-(1) by nitration of p-cresol carbonate, precipitation of the 3-nitro-p-cresol carbonate by dilution with water at from 85° to 100°C and hydrolysis of the carbonate in aqueous ammonia at 65° to 80°C or in the presence of an amine at a temperature of not more than 80°C.

German Pat. No. 206,638 discloses nitrating p-cresol carbonate, pouring the reaction mixture onto ice, heating the 3-nitro-p-cresol carbonate thus precipitated with sodium carbonate solution or caustic soda solution under reflux and obtaining 3-nitro-p-cresol-(1) from the hydrolysis mixture by filtration and precipitating the filtrate with hydrochloric acid. An article in J. Chem. Soc., 1929, pages 251, et seq. and another in the J. Amer. Chem. Soc., 55 (1933), pages 1271, et seq. each describes hydrolysis for two to three hours in boiling sodium carbonate solution. All these methods are unsatisfactory, particularly for commercial operation, in relation to simplicity, cost of working up the nitration mixture and yield of pure end product. 3-nitro-p-cresol carbonate is precipitated from its solution in monohydrate by dilution with ice and/or cold water in such a finely crystalline condition that separation of the product from the large amount of sulfuric acid is impossible or protracted and troublesome. By hydrolysis at boiling point of the 3-nitro-p-cresol carbonate with caustic soda solution or sodium carbonate solution a product is obtained which is contaminated with considerable amounts of resinous impurities and deep-colored byproducts, for example 2,3,5-trinitro-p-cresol-(1) and other polynitrocresols. The end product therefore has to be subjected to further purification steps.

It is known from an abstract of an article by Sabawin in Chemisches Zentralblatt, 1934 II, page 3463 that p-cresol carbonate is very difficult to split up with aqueous ammonia solution; decomposition proceeds best at 20°C.

It is an object of this invention to provide a new process for producing 3-nitro-p-cresol-(1) in better yields and purity in a simpler and more economical manner.

We have found that 3-nitro-p-cresol-(1) is advantageously obtained in the reaction of p-cresol carbonate with nitric acid, precipitation of the 3-nitro-p-cresol carbonate thus formed by dilution with water and hydrolysis of the 3-nitro-p-cresol carbonate with a base, by carrying out the precipitation at a temperature of from 85° to 100°C and the hydrolysis in aqueous ammonia solution at a temperature of from 65° to 80°C or in the presence of an amine of the formula (I):

$$R^1-\underset{R^2}{N}-H \qquad (I)$$

in which $R^1$ is alkyl of one to five carbon atoms or hydroxyalkyl of two to five carbon atoms, or alkoxyalkyl, aminoalkyl or N-(alkyl)-aminoalkyl each of two to five carbon atoms or N,N-(dialkyl)-amino-alkyl of three to five carbon atoms and $R^2$ is hydrogen or alkyl, the radicals $R^1$ and $R^2$ together containing two to five carbon atoms, and $R^1$ and $R^2$ together with the adjacent nitrogen atom are members of a five-membered or six-membered heterocyclic ring, at a temperature of not more than 80°C.

The reaction, in the case when ammonia or methylamine is used, may be represented by the following formulae:

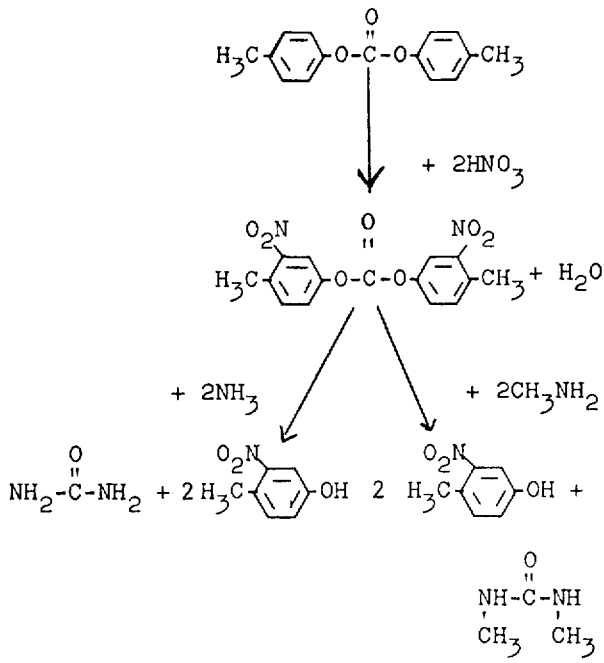

As compared with the prior art methods the process of the invention gives 3-nitro-p-cresol-(1) in better yields and purity more simply and more economically. Processing the carbonate and hydrolyzing it are simpler even on an industrial scale and result in a purer end product in a shorter period. By dilution with water the carbonate is precipitated in a form in which it can be filtered and washed particularly well. There is no appreciable hydrolysis of the carbonic ester bond. All these advantageous results are surprising having regard to the prior art.

The reaction of p-cresol carbonate with nitric acid may be carried out by conventional methods, for example by one of the methods described in the abovementioned publications. It is convenient to carry out the nitration with nitric acid, advantageously concentrated or fuming nitric acid in the presence of sulfuric acid, advantageously highly concentrated or fuming sulfuric acid. An 85 to 100% by weight nitric acid and a 98 to 100% by weight sulfuric acid are generally used. It is convenient to use among the mixtures of nitric acid and sulfuric acid those known as mixed (or nitrating) acid in which the ratio in moles of nitric acid to sulfuric acid is from 0.2:1 to 2:1. From 2 to 10 moles, preferably from 2 to 3 moles, of nitric acid is used per mole of starting material as a rule. Substances which form nitric acid in the reaction mixture, for example inorganic nitrates such as sodium or potassium nitrate, may be used in appropriate amounts instead of nitric acid.

Urea may if desired be used as a nitration catalyst, conveniently in an amount of from 10 to 100%, preferably from 45 to 55%, by weight based on p-cresol carbonate. The reaction is generally carried out at a temperature of from 0°C and 40°C, preferably from 10°C to 30°C, at atmospheric or superatmospheric pressure, batchwise or continuously. The solvent is generally the acid or acid mixture itself, if desired mixed with water as an appropriately concentrated mixture.

The reaction may be carried out as follows: a mixture of the starting material and sulfuric acid is brought to the reaction temperature and then while stirring nitric acid is added, if desired mixed with sulfuric acid, for example over fifteen to thirty minutes. The mixture is kept for another hour to three hours at the reaction temperature. The reaction may also be carried out continuously in an appropriate way for example by supplying separately to a reaction tube the said sulfuric acid mixture and the nitric acid and thoroughly mixing the two components therein with each other in a thin stream. The reaction mixture conveniently remains in the tube at the reaction temperature for from about five to thirty minutes and is then processed. An inert gas, for example nitrogen, may be passed through the reaction zone in order to remove nitrous gases.

The 3-nitro-p-cresol carbonate formed is precipitated from the reaction mixture after the reaction by dilution with water at a temperature of from 85° to 100°C, preferably from 95° to 100°C and separated. The precipitation may be carried out at atmospheric or superatmospheric pressure, continuously or batchwise. Generally from 100 to 500%, preferably from 100 to 200%, by weight of water is used, based on the total amount of acid used (calculated as 100%). It is convenient to add the reaction mixture immediately after the end of the reaction to the diluent water in a suitable vessel at such a rate that the abovementioned precipitation temperature is set up and maintained during mixing. At the abovementioned ratio of water to acid the mixing time may conveniently be from five to fifteen minutes. The dilute mixture is then advantageously stirred for another ten to twenty minutes at the precipitation temperature and then filtered.

The filter cake is supplied for hydrolysis either immediately or after having been washed with water. The 3-nitro-p-cresol carbonate obtained by precipitation is not decomposed to a marked extent. The 3-nitro-p-cresol carbonate may be hydrolyzed as a moist filter cake without drying.

When using ammonia, hydrolysis is carried out continuously or batchwise at a temperature of from 65° to 80°C, preferably from 70° to 75°C, at atmospheric or superatmospheric pressure in aqueous ammonia solution, advantageously from 5 to 25%, particularly from 10 to 15%, by weight ammonia solution. It is preferred to use from 4 to 8 moles, particularly from 4 to 5 moles, of ammonia per mole of p-cresol carbonate used and a hydrolysis period of from 2 to 15, particularly from 4 to 6 minutes.

Hydrolysis of the 3-nitro-p-cresol carbonate may also be carried out in the presence of an amine or a mixture of amines (I) without water or conveniently with water. Hydrolysis may be carried out at a temperature of from 65° to 80°C, preferably from 70° to 75°C, but generally temperatures below 65°C, conveniently from 15° to 60°C, particularly from 20° to 50°C are preferred. Hydrolysis is carried out at atmospheric or superatmospheric pressure, continuously or batchwise, in the presence of an amine (I), preferably in the presence of an aqueous, advantageously from 5 to 80%, particularly from 20 to 60%, by weight solution of an amine (I). It is preferred to use from 3 to 8 moles, particularly from 4 to 5 moles of amine (I) per mole of p-cresol carbonate and a hydrolysis period of from two to fifteen minutes, particularly from four to six minutes. Frequently the reaction is commenced at 20°C because even when an aqueous paste of 3-nitro-p-cresol carbonate and an aqueous solution of amine solution or the pure amine (I) are brought together and stirred an exothermic reaction occurs in the course of which the carbonate is hydrolyzed into 3-nitro-p-cresol-1 within from four to six minutes and the temperature rises to from about 40° to 50°C. If this rise in temperature is not sufficient for dissolving and hydrolyzing the 3-nitro-p-cresol carbonate the hydrolysis mixture is conveniently kept at from 40° to 60°C for another five to nine minutes.

Preferred amines are monosubstituted or disubstituted amines or similarly monosubstituted, disubstituted or trisubstituted diamines of formula (I) in which $R^1$ is alkyl of one, two or three carbon atoms, hydroxyalkyl of two or three carbon atoms or alkoxyalkyl, aminoalkyl or N-(alkyl)aminoalkyl of two, three or four carbon atoms in each case or a N,N-(dialkyl)-aminoalkyl radical of four or five carbon atoms and $R^2$ is a hydrogen atom or alkyl, and the radicals $R^1$ and $R^2$ together contain two, three or four carbon atoms, and moreover $R^1$ and $R^2$ together with the adjacent nitrogen atom form a pyrrolidinyl or piperidinyl radical. The abovementioned alkyl radicals and alkyl groups forming substituents on the said radicals may be linear or branched. For example the following amines (I) are suitable: ethylamine, diethylamine, isopropylamine, n-pentylamine, tert.-butylamine, isobutylamine, pyrrolidine, piperidine, pyrroline, ethylene diamine, N-methylethylenediamine, N,N'-dimethylethylenediamine, ethanolamine, N-methylethanolamine, N-ethylethanolamine, 3-methoxypropyl-(1)-amine, 3-hydroxypropyl-(1)-amine, 2-ethoxyethylamine, N,N-dimethylethylenediamine, N,N-dimethylpropylenediamine, propylenediamine, butylenediamine, N-methylpropylenediamine and N-ethyl-ethylenediamine; methylamine is particularly suitable and may be used as the commercial 40% by weight solution.

After having been hydrolyzed the end product is isolated from the hydrolysis mixture by a conventional method, for example by acidification of the mixture, separation of the 2-nitro-p-cresol-(1) formed as a by-product by steam distillation, cooling and filtration. In a preferred embodiment 2-nitro-p-cresol-(1) is similarly separated by steam distillation from the hydrolysis mixture, a suitable alkanol which is sparingly miscible with water such as isobutanol is added to the mixture, and the end product is extracted and isolated from the extract by distilling off the solvent. It is advantageous to use from 200 to 500%, preferably from 200 to 300%, by weight of isobutanol based on the p-cresol carbonate used. The end product may however be processed immediately in the isobutanol solution, preferably by hydrogenation in the presence of Raney nickel to form 3-amino-p-cresol-(1) which is obtained in particularly pure condition in this way.

The compound which can be prepared by the process of the invention is a valuable starting material for the production of dyes and herbicides. The abovementioned publications and Ullmanns Encyklopadie der technischen Chemie, volume 13, page 8 and volume 3, page 474, may be referred to for details of the uses.

The following Examples illustrate the invention; the parts given are parts by weight.

EXAMPLE 1

242 parts of p-cresol carbonate is dissolved in 2420 parts of monohydrate ((100% sulfuric acid) at 10° to 15°C. At the same temperature a mixed acid of 149 parts of nitric acid (92% by weight) and 333 parts of monohydrate is added within sixty minutes and the mixture is stirred for another two hours at 25°C. The mixture is then introduced continuously within eight minutes into 4500 parts of water while stirring, a mixing temperature of 95° to 100°C being set up and maintained. The whole is stirred for another twelve minutes, the crystals of 3-nitro-p-cresol carbonate formed are suction filtered and the filter cake is washed with water. The precipitated 430 parts of moist 3-nitro-p-cresol carbonate (containing 140 parts of water) is suspended in 300 parts of water and 300 parts of 20% by weight aqueous ammonia solution is added. The mixture is heated to about 70°C while stirring and kept at this temperature for five minutes, the 3-nitro-p-cresol carbonate passing into solution. The mixture is acidified with hydrochloric acid to pH 2.5, the isomeric 2-nitro-p-cresol-(1) is expelled with steam, and the 3-nitro-p-cresol formed is allowed to crystallize out after cooling and suction filtered. 250 parts of 3-nitro-p-cresol-(1) calculated as 100% is obtained, equivalent to a yield of 81.5% based on p-cresol carbonate used. It is obtained in the form of yellow crystals having a purity of 95% by weight and a melting point of from 69° to 75°C.

EXAMPLE 2

Nitration, precipitation and hydrolysis are carried out as in Example 1. The hydrolysis mixture which has been distilled with steam is extracted for eight minutes at 55°C with 320 parts of isobutanol. The organic phase is separated and distilled. The residue is 254 parts of end product calculated as 100%, i.e. 83% of theory; the melting point is 69° to 73°C.

EXAMPLE 3

242 parts of p-cresol carbonate is dissolved in 2420 parts of monohydrate at 10° to 15°C. At the same temperature a mixed acid of 149 parts of nitric acid (92% by weight) and 333 parts of monohydrate is added within sixty minutes and the mixture is stirred for another two hours at 25°C after the addition. The mixture is then introduced continuously within eight minutes into 4500 parts of water while stirring, a temperature of 95° to 100°C being set up and maintained. Stirring is continued for twelve minutes, the crystals of 3-nitro-p-cresol carbonate formed are suction filtered and the filter cake is washed with water. The precipitated 430 parts of moist 3-nitro-p-cresol carbonate (containing 140 parts of water) is suspended in 300 parts of water and 340 parts of 40% by weight aqueous methylamine solution is added. The mixture is heated to about 70°C while stirring and kept at this temperature for five minutes, the 3-nitro-p-cresol carbonate passing into solution. The mixture is acidified to pH 2.5 with hydrochloric acid, the isomeric 2-nitro-p-cresol-(1) is expelled with steam, and the 3-nitro-p-cresol-(1) formed is allowed to crystallize out after cooling and suction filtered. 250 parts of 3-nitro-p-cresol-(1) calculated as 100% is obtained, equivalent to 81.5% of theory based on p-cresol carbonate used, in the form of yellow crystals having a purity of 96% by weight and a melting point of 70° to 75°C.

EXAMPLE 4

The production of 3-nitro-p-cresol-(1) is carried out analogously to Example 1. The 430 parts of precipitated moist 3-nitro-p-cresol carbonate formed (containing 140 parts of water) is suspended in 450 parts of water and 270 parts of ethylene diamine is added while stirring. The mixture is heated to about 70°C and kept at this temperature for five minutes, the 3-nitro-p-cresol carbonate passing into solution. The mixture is acidified with hydrochloric acid to pH 2.5, the isomeric 2-nitro-p-cresol-(1) is driven off with steam, and the 3-nitro-p-cresol-(1) formed is allowed to crystallize out after cooling and suction filtered. 246 parts of 3-nitro-p-cresol-(1) calculated as 100%, equivalent to a yield of 80.5% based on p-cresol carbonate used, of the melting point 69° to 72°C is obtained in the form of yellow crystals having a purity of 95% by weight.

EXAMPLE 5

3-nitro-p-cresol carbonate is produced in the manner described in Example 1. The 430 parts of precipitated moist 3-nitro-p-cresol carbonate (containing 140 parts of water) is suspended in 450 parts of water and 230 parts of ethanolamine is added while stirring. The mixture is heated to about 70°C while stirring and kept at this temperature for five minutes, the 3-nitro-p-cresol carbonate passing into solution. The mixture is acidified to pH 2.5 with hydrochloric acid, the isomeric 2-nitro-p-cresol-(1) is expelled with steam, and the 3-nitro-p-cresol-(1) formed is allowed to crystallize after cooling and suction filtered. 248 parts of 3-nitro-p-cresol-(1) calculated as 100% and equivalent to 81% of theory based on p-cresol carbonate is obtained in the form of yellow crystals having a purity of 95% by weight.

EXAMPLE 6

3-nitro-p-cresol carbonate is produced in the manner described in Example 1. The 430 parts of precipitated 3-nitro-p-cresol carbonate (containing 140 parts of water) is suspended in 450 parts of water and 340 parts of pyrrolidone is added while stirring. The mixture is heated to about 70°C while stirring and kept at this temperature for five minutes, the 3-nitro-p-cresol carbonate passing into solution. The mixture is acidified to pH 2.5 with hydrochloric acid, the isomeric 2-nitro-p-cresol-(1) is expelled with steam and after cooling the 3-nitro-p-cresol-(1) is suction filtered. 244 parts of 3-nitro-p-cresol-(1) calculated as 100%, equivalent to a yield of 80% based on p-cresol carbonate used and having a melting point of 67° to 71°C is obtained with a purity of 94%.

EXAMPLE 7

242 parts of p-cresol carbonate is dissolved in 2420 parts of monohydrate at 10° to 15°C. At the same temperature a mixed acid of 149 parts of nitric acid (92% by weight) and 333 parts of monohydrate is added over sixty minutes and the mixture is stirred for another two hours after the addition at 25°C. The mixture is continuously introduced into 4500 parts of water within eight minutes while stirring, a temperature of 95° to 100°C being set up and maintained. The whole is stirred for another twelve minutes, the crystals of 3-nitro-p-cresol carbonate are suction filtered and the filter cake is washed with water. The precipitated 430 parts of moist 3-nitro-p-cresol carbonate (containing 140 parts of water) is suspended in 300 parts of water and 350 parts of 40% by weight aqueous methylamine solution is added at 20°C while mixing well. The temperature rises to 45°C in six minutes. The mixture is acidified to pH 3 with hydrochloric acid, the isomeric 2-nitro-p-cresol-(1) is expelled with steam, and the 3-nitro-p-cresol-(1) formed is allowed to crystallize after cooling and suction filtered. 250 parts of 3-nitro-p-cresol-(1) calculated as 100% is obtained, equivalent to 81.5% yield based on p-cresol carbonate used. It is in the form of yellow crystals having a melting point of 69° to 75°C.

EXAMPLE 8

Nitration, precipitation and working up are carried out as described in Example 1. For hydrolysis 430 parts of moist 3-nitro-p-cresol carbonate (67.5% by weight) is suspended in 300 parts of water and 340 parts of pyrrolidine is added at 20°C while stirring. The temperature rises to 50°C and a deep-colored solution is formed within 5.5 minutes. 244 parts of 3-nitro-p-cresol-(1), calculated as 100% (80% of theory based on p-cresol carbonate used), is obtained having a melting point of 69° to 73°C.

EXAMPLE 9

Nitration, precipitation and working up are carried out as described in Example 1. For hydrolysis 430 parts of moist 3-nitro-p-cresol carbonate (67.5% by weight) is suspended in 440 parts of water and 290 parts of 3-methoxypropylamine is added while stirring at 20°C. The temperature rises to 45°C within eight minutes. The mixture is kept at this temperature for five minutes, a solution thus being formed. 245 parts of 3-nitro-p-cresol-(1), calculated as 100% (80% of theory based on p-cresol carbonate used) is obtained having a melting point of 67° to 71°C.

EXAMPLE 10

Nitration, precipitation and working up are carried out as described in Example 1. For hydrolysis 430 parts of moist 3-nitro-p-cresol carbonate (67.5% by weight) is suspended in 500 parts of water and 230 parts of monoethanolamine is added at 20°C while stirring. The temperature rises to 55°C within eight minutes. The mixture is kept at this temperature for five minutes, a solution thus being formed. 246 parts of 3-nitro-p-cresol-(1) calculated as 100% (80% of theory based on p-cresol carbonate used) and having a melting point of 67° to 70°C is obtained.

EXAMPLE 11

Nitration, precipitation and working up are carried out as described in Example 1. For hydrolysis 430 parts of moist 3-nitro-p-cresol carbonate (67.5% by weight) is suspended in 350 parts of water and 270 parts of ethylenediamine is added while stirring. The temperature rises within eight minutes to 50°C. The mixture is kept at this temperature for five minutes so that a solution is formed. 244 parts of 3-nitro-p-cresol-(1), calculated as 100%, (80% of theory based on p-cresol carbonate used) and having a melting point 68° to 72°C is obtained.

EXAMPLE 12

Nitration and precipitation of the 3-nitro-p-cresol carbonate are carried out as described in Example 1.

430 parts of moist 3-nitro-p-cresol carbonate (67.7% by weight) is suspended in 300 parts of water and 230 parts of ethylamine is added at 20°C while stirring. The temperature rises to 50°C in five minutes and a deep-colored solution is formed. Further working up is carried out as described in Example 1. 240 parts of 3-nitro-p-cresol-(1), calculated as 100% (78% of theory based on p-cresol carbonate used) and having a melting point of 69° to 73°C is obtained.

We claim:

1. A process for the production of 3-nitro-p-cresol-(1) which comprises nitrating p-cresol carbonate with a nitrating agent selected from the group consisting of (a) concentrated nitric acid of 85–100% by weight concentration, and (b) a mixture of said nitric acid of said concentration and concentrated sulfuric acid of 98–100% by weight concentration in a ratio of 0.2 to 2 moles of nitric acid per mole of sulfuric acid at a temperature of 0°C to 40°C, precipitating the 3-nitro-p-cresol carbonate thus formed by dilution of the reaction mixture with 100 to 500% by weight of water, based on the total amount of said acid or acids used for said nitration (calculated as 100%), at a temperature of 85°–100°C, and hydrolyzing the 3-nitro-p-cresol carbonate in the presence of a 5–25% by weight aqueous ammonia solution at 65°–80°C and at a ratio of 4 to 8 moles of ammonia per mole of said 3-nitro-p-cresol carbonate.

2. A process as claimed in claim 1 wherein said nitrating is carried out with said mixture (b).

3. A process as claimed in claim 1 wherein the nitration is carried out with urea as a nitration catalyst in an amount of from 10–100% by weight based on p-cresol carbonate.

4. A process as claimed in claim 1 wherein the nitration is carried out at a temperature of from 10°–30°C.

5. A process as claimed in claim 1 wherein the precipitation is carried out at a temperature of from 95°–100°C.

6. A process as claimed in claim 1 wherein the hydrolysis is carried out at 70°–75°C.

7. A process as claimed in claim 1 wherein the 2-nitro-p-cresol-(1) is separated from the hydrolysis mixture by steam distillation, an alkanol which is sparingly miscible with water is added in an amount of from 200–500% based on the p-cresol carbonate, and the end product is extracted.

8. A process for the production of 3-nitro-p-cresol-(1) which comprises nitrating p-cresol carbonate with a nitrating agent selected from the group consisting of (a) concentrated nitric acid of 85–100% by weight concentration, and (b) a mixture of said nitric acid of said concentration and concentrated sulfuric acid of 98–100% by weight concentration in a ratio of 0.2 to 2 moles of nitric acid per mole of sulfuric acid at a temperature of 0°C to 40°C, precipitating the 3-nitro-p-cresol carbonate thus formed by dilution of the reaction mixture with 100–500% by weight of water, based on the total amount of said acid or acids used for said nitration (calculated as 100%), at a temperature of 85°–100°C, and hydrolyzing the 3-nitro-p-cresol carbonate in the presence of an amine of the formula $$R^1-\underset{R^2}{N}-H$$

in which $R^1$ is alkyl of one to five carbon atoms or hydroxyalkyl of two to five carbon atoms or alkoxyalkyl, aminoalkyl or N-(alkyl)-aminoalkyl each of two to five carbon atoms, or N,N-(dialkyl)-aminoalkyl of three to five carbon atoms, and $R^2$ is hydrogen or alkyl, the radicals $R^1$ and $R^2$ together containing a total of two to five carbon atoms or in which $R^1$ and $R^2$ together with the adjacent nitrogen atom form a heterocyclic ring at 15°–60°C and at a ratio of 3–8 moles of said amine per mole of said 3-nitro-p-cresol carbonate.

9. A process as claimed in claim 8 wherein said nitrating is carried out with said mixture (b).

10. A process as claimed in claim 8 wherein the nitration is carried out with urea as a nitration catalyst in an amount of from 10–100% by weight based on p-cresol carbonate.

11. A process as claimed in claim 8 wherein the nitration is carried out at a temperature of from 10°–30°C.

12. A process as claimed in claim 8 wherein the precipitation is carried out at a temperature of from 95°–100°C.

13. A process as claimed in claim 8 wherein the hydrolysis is carried out at 20°–50°C.

14. A process as claimed in claim 8 wherein the 2-nitro-p-cresol-(1) is separated from the hydrolysis mixture by steam distillation, an alkanol which is sparingly miscible with water is added in an amount of from 200–500% based on the p-cresol carbonate, and the end product is extracted.

* * * * *